United States Patent [19]

Cipolli et al.

[11] Patent Number: 5,124,379

[45] Date of Patent: Jun. 23, 1992

[54] SELF-EXTINGUISHING POLYMERIC COMPOSITIONS

[75] Inventors: Roberto Cipolli, Novara; Roberto Oriani, Milan; Gilberto Nucida, S. Giuliano Milanese; Mario Pirozzi, San Donato Milanese; Enrico Masarati, Castelnovo Valtidone, all of Italy

[73] Assignee: Presidenza del Consiglio dei Ministri Ufficio del Ministro per il Coordinamento delle Iniziative per la Ricerca Scientifica e Tecnologica, Rome, Italy

[21] Appl. No.: 547,300

[22] Filed: Jul. 3, 1990

[30] Foreign Application Priority Data

Jul. 3, 1989 [IT] Italy ............... 21066 A/89

[51] Int. Cl.$^5$ ............... C08K 5/3435; C08K 5/3492
[52] U.S. Cl. ............... 524/97; 524/100
[58] Field of Search ............... 524/97, 100, 416

[56] References Cited

U.S. PATENT DOCUMENTS

| | | | |
|---|---|---|---|
| 3,810,862 | 5/1974 | Mathis | 524/100 |
| 4,201,705 | 6/1980 | Halpern et al. | 524/100 |
| 4,321,374 | 3/1982 | Morimura et al. | 524/100 |
| 4,504,610 | 3/1985 | Fontanelli et al. | 524/100 |
| 4,634,726 | 1/1987 | Martin | 524/100 |
| 4,727,102 | 2/1988 | Scarso | 524/100 |
| 4,801,508 | 1/1989 | Lutz et al. | 524/100 |
| 4,812,499 | 3/1989 | Cipriani et al. | 524/100 |
| 4,879,327 | 11/1989 | Poisson et al. | 524/100 |

Primary Examiner—Kriellion S. Morgan
Attorney, Agent, or Firm—Stevens, Davis, Miller & Mosher

[57] ABSTRACT

Polymeric compositions endowed with high self-extinguishing characteristics when exposed to a flame, based on thermoplastic polymers or polymers endowed with elastomeric properties, in particular olefinic polymers or copolymers, comprising:
(a) from 89 to 45 parts by weight of a thermoplastic polymer, or of a polymer endowed with elastomeric properties;
(b) from 8 to 30 parts by weight of one or more ammonium or amine phosphates(s) and/or phosphonate(s);
(c) from 3 to 25 parts by weight of one or more compound(s) derivatives of 2,4,6-triamino-1,3,5-triazine, having the general formula (I):

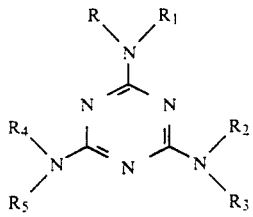

wherein at least one of the radicals from R to $R_5$ is:

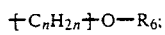

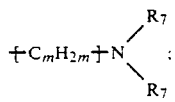

wherein:
n = an integer comprised within the range of from 2 to 8;
m = an integer comprised within the range of from 2 to 6;
$R_6$ = H; ($C_1$–$C_8$)-alkyl; ($C_2$–$C_6$)-alkenyl; $-(C_pH_{2p})-O-R_8$, wherein p is an integer comprised within the range of from 1 to 4 and $R_8$ is either H or a ($C_1$–$C_4$)-alkyl; ($C_6$–$C_{12}$)-cycloalkyl or ($C_6$–$C_{12}$)-alkylcycloalkyl;
the radicals $R_7$, which can be either equal to, or different from one another, are: H; ($C_1$–$C_8$)-alkyl; ($C_2$–$C_6$)-alkenyl; ($C_6$–$C_{12}$)-cycloalkyl or -alkylcycloalkyl; ($C_1$–$C_4$)-hydroxyalkyl; or the moiety:

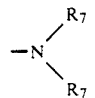

is replaced by a heterocyclic radical linked to the alkyl chain through the nitrogen atom and possibly containing another heteroatom preferably selected from the group consisting of O, S, N; or in the general formula (I) at least one of the moieties

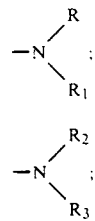

(Abstract continued on next page.)

-continued

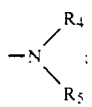

is replaced by a heterocyclic radical linked to the triazinic ring through the nitrogen atom and possibly containing another heteroatom preferably selected from the group consisting of O, S, N; the other radicals from R to $R_5$, which can be either equal to, or different from one another, have the abovesaid meaning, or they are: H; $(C_1-C_{18})$-alkyl; $(C_2-C_8)$-alkenyl; $(C_6-C_{16})$-cycloalkyl or $(C_6-C_{16})$-alkylcycloalkyl, possibly substituted with a hydroxy or $(C_1-C_4)$-hydroxyalkyl function.

13 Claims, No Drawings

SELF-EXTINGUISHING POLYMERIC COMPOSITIONS

FIELD OF THE INVENTION

The present invention relates to self-extinguishing based on thermoplastic polymers or on polymers endowed with elastomeric properties, in particular olefinic polymers or copolymers, containing special triazinic compounds in combination with ammonium or amine phosphates and/or phosphonates.

BACKGROUND OF THE INVENTION

Several solutions are known in the art to reduce or eliminate the combustibility of polymers. Some of such solutions are based on the use of metal compounds, in particular of antimony, bismuth, or arsenic, in combination with partially halogenated, thermally unstable organic compounds, such as chlorinated paraffinic waxes.

Other solutions are based on the use of substances capable of yielding intumescence. The formulations of intumescent type are generally constituted by the polymer and at least three main additives: an essentially phosphorus-containing additive, whose purpose is of forming, during the combustion, an impermeable, semi-solid vitreous layer, essentially constituted by polyphosphoric acid, and of activating the process of formation of intumescence; a second additive, containing nitrogen, which performs the functions of a foaming agent; and a third, carbon-containing additive, which acts as a carbon donor to allow an insulating cellular carbonaceous layer ("char") to be formed between the polymer and the flame.

Examples of intumescent formulations of this type are those reported by the following patents: U.S. Pat. No. 3,810,862 (Phillips Petroleum Co.) based on melamine, pentaerythritol and ammonium polyphosphate; U.S. Pat. No. 4,727,102 (Vamp S.r.l.), based on melamine cyanurate, a hydroxyalkyl derivative of isocyanuric acid and ammonium polyphosphate; and by published patent application WO-85/05,626 (Plascoat U.K. Limited), on the basis of various phosphorus and nitrogen compounds among which, in particular, a combination of melamine phosphate pentaerythritol and ammonium polyphosphate has to be cited.

In more recent formulations, together with the use of an organic or inorganic phosphorus compound a nitrogen-containing organic compound was used, generally consisting of an amino plastic resin obtained by condensation of urea, melamine or dicyandiamide with formaldehyde.

Examples of formulations containing two additives are those reported in the following patents: U.S. Pat. No. 4,504,610 (Montedison S.p.A.) based on oligomeric derivatives of 1,3,5-triazine and ammonium polyphosphate and European Patent No. 14,463 (Montedison S.p.A.) based on organic compounds selected from among benzylguanamine and reaction products between aldehydes and several nitrogenous cyclic compounds, in particular benzylguanamine-formaldehyde copolymers, and ammonium polyphosphate.

Self-extinguishing compositions can be also obtained by using single-component additives, which contain in their organic molecule both nitrogen and phosphorus atoms, as disclosed in U.S. Pat. No. 4,201,705 (Borg-Wagner Corp.).

These intumescent flame retardant systems endow the polymer, which contain them, with the property of forming a carbonaceous residue when they undergo a fire, or are exposed to a flame. This kind of flame-retardant systems display a large number of advantages: absence of phenomena of corrosion in the machinery in which the polymers are processed, a lower emission of smoke as compared to the systems containing metal compounds and halogenated hydrocarbons, and, above all, the possibility of endowing the polymers with satisfactory flame-proof properties. with a smaller amount of total additive and therefore without excessively impairing the mechanical properties of the same polymers.

SUMMARY OF THE INVENTION

The present applicant has surprisingly found now that the above said polymers can be given satisfactory flame-proof properties by using additives which make possible obtaining polymeric compositions, which contain:

(a) a lower content of ammonium, or amine phosphate and/or phosphonate than the compositions known from the prior art; as well as (b) nitrogen compounds, which are derivatives of 2,4,6-triamino-1,3,5-triazine with an extremely simple structure, in that they are obtained by entering in such a compound which, however, is not capable of endowing the above said polymers with self-extinguishing characteristics, a suitable substituent selected from among the moieties disclosed in the following.

The above said compositions are furthermore endowed with the advantage that in case of a fire, they give rise to a very xierate and not obscuring smoke emission.

DETAILED DESCRIPTION OF THE INVENTION

More specifically, the compositions according to the present invention comprise:

(a) from 89 to 45 parts by weight of a thermoplastic polymer, or of a polymer endowed with elastomeric properties;

(b) from 8 to 30 parts, and preferably from 12 to 30 parts by weight of one or more ammonium or amine phosphate(s) and/or phosphonate(s);

(c) from 3 to 25 parts, and preferably from 6 to 20 parts by weight of one or more compound(s) derivatives of 2,4,6-triamino-1,3,5-triazine, having the general formula (I)

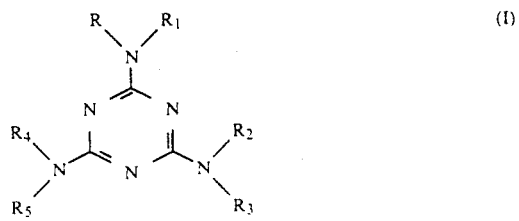

wherein at least one of the radicals from R to $R_5$ is:

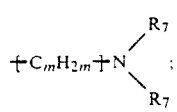

wherein:

n = an integer comprised within the range of from 2 to 8, and preferably from 2 to 4;

m = an integer comprised within the range of from 2 to 6;

$R_6$ = H; ($C_1$-$C_8$)-alkyl, and preferably H ($C_1$-$C_4$)-alkyl; ($C_2$-$C_6$)-alkenyl; —[—$C_pH_{2p}$—]—O—$R_8$, wherein p is an integer comprised within the range of from 1 to 4 and $R_8$ is either H or a ($C_1$-$C_4$)-alkyl; ($C_6$-$C_{12}$)-cycloalkyl or ($C_6$-$C_{12}$)-alkylcycloalkyl;

the radicals $R_7$, which can be either equal to, or different from, one another, are:

H; ($C_1$-$C_8$)-alkyl; ($C_2$-$C_6$)-alkenyl; ($C_6$-$C_{12}$)-cycloalkyl or ($C_6$-$C_{12}$)-alky

is replaced by a heterocyclic radical linked to the alkyl chain through the nitrogen atom and possibly containing another heteroatom preferably selected from the group consisting of O, S, or in general formula (I) at least one of the moieties

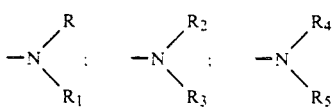

is replaced by a heterocyclic radical linked to the triazinic through the nitrogen atom and possibly containing another heteroatom preferably selected from the group consisting of O, S, N;

the other radicals from R to $R_5$, which can be either equal to, or different from one another, have the above said meaning, or they are:

H; ($C_1$-$C_{18}$)-alkyl; ($C_2$-$C_8$)-alkenyl; ($C_6$-$C_{16}$)-cycloalkyl or ($C_6$-$C_{16}$)-alkylcycloalkyl, possibly substituted with a hydroxy or ($C_1$-$C_4$)-hyroxyalkyl function.

Examples of radicals from R to $R_5$ in the above general formula (I) are:

methyl; ethyl; propyl; isopropyl; n-butyl; isobutyl; tert-butyl; n-pentyl; isopentyl; n-hexyl; tert-hexyl; octyl; tert-octyl; decyl; dodecyl; octadecyl; ethenyl; propenyl; butenyl; isobutenyl; hexenyl; octenyl; cyclohexyl; propylcyclohexyl; butyl cyclohexyl; decyl cyclohexyl; idroxycyclohexyl; idroxyethyl cyclohexyl; 2-hydroxyethyl; 2-hydroxypropyl; 3-hydroxypropyl; 3-hyroxybutyl; 4-hydroxybutyl; 3-hydroxypentyl -hydroxyhexyl; 3-hydroxy-2,5-dimethyl hexyl; 7-hydroxyheptyl; 7-hyroxyoctyl; 2-methoxy ethyl; 2-methoxy propy propel; 4-methoxy butyl; 6-methoxy hexyl; 7-methoxyheptyl; 7-methoxy octyl; 2-ethoxy ethyl; 3-ethoxy propyl; 4-ethoxy butyl; 3-propoxy propyl; 3-butoxy propyl; 4-butoxy-butyl; 4-isobutoxy butyl; 5-propoxy pentyl; 2-cyclohexyloxy ethyl; 2-ethenyloxy 4-(N,N-dimethylamino)ethyl; 3-(N,N-dimethylamino propyl; (N,N-diethylamino) butyl; 5-(N,N-dimethylamino) pentyl; 4-(N,N-diethylamino) butyl; 5-(N,N-diethylamino) pentyl; 5-(N,N-diisobutyl amino) pentyl; 3-(N-ethylamino) propyl; 4-(N-methylamino) butyl; 4-(N,N-dipropylamino) butyl; 2-(N,N-diisopropylamino) ethyl; 6-(N-hexenylamino) hexyl; 2-(N-ethenylamino) ethyl; 2-(N-cyclohexylamino) ethyl; 6-(N-propylamino) hexyl; 2-(2-methoxyethoxy) ethyl; 3-(2-hydroxyethoxy) propyl; 2-(2-hydroxy ethoxy) ethyl; 4-(3-propoxy) butyl; 4-(2-ethoxy ethoxy) butyl; 4-(2-butoxy ethyl; and so forth.

Examples of heterocyclic radicals which can replace the moieties:

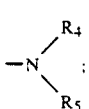

are: aziridine; pyrrolidine; piperidine; morpholine; thiomorpholine; piperazine; 4-methyl piperazine; 4-ethylpiperazine; 2-methylpiperazine, 2,5-dimethylpiperazine; 2,3,5,6-tetramethyl-piperazine; 2,2,5,5-tetramethylpiperazine; 2-ethylpiperazine; 2,5-diethylpiperazine; and so forth.

Examples of heterocyclic radicals which can replace the moiety:

are: aziridine; pyrrolidine; piperadine; morpholine; thiomorpholine; piperazine; 4-methylpiperazine; 4-ethylpiperazine; and so forth.

The compounds of formula (I) in which either one or two of the moieties:

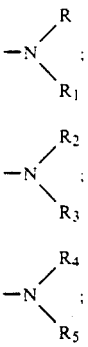

is (are) replaced by:

radical are preferred.

Specific compounds comprised within the scope of general formula (I), which can be advantageously used in the compositions according to the present invention are reported in the examples which follow the instant disclosure.

The compounds of general formula (I) can be prepared by processes known from the prior art by reacting a halide of cyanuric acid, such as, e.g., cyanuric chloride, at a temperature comprised within the range of from 0° to 10° C., in a suitable solvent (such as, e.g., acetone, water, methylene chloride, and so forth) with an amine having the general formula (II):

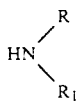 (II)

wherein R and $R_1$ have the same meaning as defined above, in the presence of not (according to the molar ratio used in the reaction) of an acid acceptor, such as, e.g., NaOH, NaHCO$_3$, Na$_2$CO$_3$ or triethylamine, with the intermediate (III):

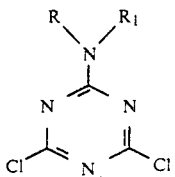 (III)

being thus obtained.

Such an intermediate, either separated or not separated from the reaction mixture, is subsequently reacted under conditions similar to those as hereinabove specified, but operating at a higher temperature, e.g., at a temperature comprised within the range of from 10° to 50° C. with an amine of general formula (IV):

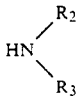 (IV)

wherein $R_2$ and $R_3$ have the hereinabove defined meaning, with the intermediate (V):

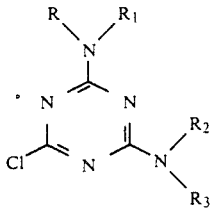 (V)

being obtained.

The intermediate (V), either separated or not from the mixture, is reacted in its turn under the same as of the two first reaction steps, but operating at a higher temperature than of the preceding step, e.g., at a temperature comprised within the range of from 70° to 150° C., and hence with a solvent being used, which also is compatible with such temperature values (such as, e.g., toluene, water, xylene, dimethylformamide, dichlorobenzene and so forth) with an amine the general formula (VI):

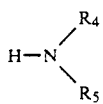 (VI)

wherein $R_4$ and $R_5$ have the same meanings as already defined with the compounds of general formula (I) being obtained the end products.

In case compounds of general formula (I) containing two aminic substituents are desired, the process is carried out either by reacting the intermediate (III) with two mols of an amine of general formula (IV), or by reacting a halide of cyanuric acid, such as, e.g., cyanuric chloride with two mols of an amine of general formula (II) and then, separating or not the product, and causing it to further react with one mol of amine of general formula (VI), under the same conditions as disclosed hereinabove.

Among the phosphates, ammonium polyphosphates falling within the scope of the general formula $$(NH_4)_{n+2}P_nO_{3n+1}$$

wherein n is an integer equal to, or larger than, 2, are preferred; the molecular weight of polyphosphates should be high enough, to secure a low solubility in water. For indicative purposes, n is preferably comprised within the range of from 2 to The composition of the polyphosphates having the hereinabove indicated formula, in which n is a high enough numeral, and is preferably comprised within the range of from 5 to 500, practically is the one which corresponds to metaphosphate formula $$(NH_4PO_3)_n.$$

An example of such polyphosphates is the product known under the trade name "Exolit 422" (manufactured and traded by Hoechst) and having the composition (NH$_4$PO$_3$)$_n$ in which n is larger than 50; another example is the product known under the mark "Phos-Chek P/30" (Monsanto Chemical), and having a similar composition.

Another polyphosphate which can be advantageously used, above all thanks to its low water solubility, is the product known under the trade name "Exolit 462" (manufactured and traded by Hoechst) and corresponding to Exolit 422 microencapsulated in melamine-formaldehyde resin Other phosphates which can be used are those which derive from amines, such as, e.g., dimethyl ammonium phosphate or diethyl ammonium phosphate, ethylene diamine phosphate, melamine ortho or pyrophosphate.

Among the phosphonates good results have been achieved by using mono or polyammonium phosphonates selected from among the salts derived from mono or polyphosphonic acids.

Examples of the acids are: ethane-1 1,2-triphosphonic acid; ethane-2-hydroxy-1,1,2-triphosphonic acid; propane-1,2,3-triphosphonic acid; methylphosphonic acid; ethylphosphonic acid; n-propylphosphonic acid; n-butylphosphonic acid; phenylphosphonic acid; ethane-1-amino-1,1-diphosphonic acid; ethane-1-hydroxy-1,1-diphosphonic acid; dodecane-1-hydroxy-1,1-diphosphinic acid; phosphousacetic acid; 2-phosphouspropionic acid; 3-phosphouspropionic acid; 2-phosphousbutyric acid; 4-phosphousbutyric acid, aminetri(methylenephosphonic)acid; ethylenediaminetetra(methylenephosphonic) acid; hexamethylenediaminetetra(-methylenephosphonic)acid; diethylenetriaminepenta(-methylenephosphonic acid; and so forth.

Among the polymers which can be used in the compositions according to the present invention, preferred are polymers and copolymers of olefins of general formula

wherein R is a hydrogen atom of a (C$_1$-C$_8$)-alkyl or -aryl radical, in particular:

(1) either isotactic or prevailingly isotactic polypropylene;

(2) HDPE, LLDPE, LDPE polyethylene;

(3) crystalline copolymers of propylene with minor proportions of ethylene and/or of other alpha-olefins, such as 1-butene, 1-hexene, 1-octene, 4-methyl-1-pentene;

(4) heterophasic compositions comprising (A) a fraction constituted by a propylene homopolymer, or by one of the copolymers as per above item (3); and (B) a copolymeric fraction constituted by elastomeric copolymers of ethylene with an alpha-olefin, possibly containing minor proportions of a diene, wherein the alpha-olefin is preferably selected from among propylene and 1-butene;

(5) elastomeric copolymers of ethylene with alpha-olefins possibly containing minor proportions of a diene.

Examples of dienes more commonly contained in said elastomeric copolymers are butadiene, ethyldene-norbornene, hexadiene-1,4.

Among the polymers of olefins of general formula R—CH=CH$_2$ wherein R is an aryl radical, "crystal" and impact-resistant polystyrene are preferred.

Other examples of polymers which can be commonly used are acrylonitrile/butadiene/styrene terpolymers (ABS); styrene/acrylonitrile copolymers (SAN); polyurethane (of either polyester or polyether grade); poly(ethylene terephthalate); poly(butylene terephthalate); polyamides; and so forth.

The self-extinguishing compositions according to the present invention can be prepared according to methods known from the prior art; for example, ammonium or amine phosphate and/or phosphonate is first intimately mixed with one or more finely ground nitrogen-containing compounds of general formula (I) (the particles of which are generally smaller than 70 μm) and the so obtained mixture is added to the polymer in a turbo-mixer to generate a homogeneous mixture, which is either extruded or granulated. The so obtained granular product can be transformed into various finished articles according to any of the known molding techniques.

The fire-retardant additives according to the present invention are suitable for use in the field of flame-retardant paints too.

EXAMPLES

The following examples illustrate the features of the present invention without limiting it.

EXAMPLE 1

184.5 g of cyanuric chloride and 800 cm$^3$ of acetone are charged to a reactor of 3 liters of capacity, equipped with stirrer, thermometer, charging funnel, reflux condenser and heating bath.

The reaction mixture is heated with stirring up to 40° C. until a solution is obtained, then 284 g of a solution of ammonia at 30% by weight are added within a 1 hour and 30 minutes time, with the temperature being kept at 40° C. The reaction mixture is then heated to 45° C., and is kept 4 hours at this temperature.

After cooling, the product formed is filtered off and is washed on the same filter, with water.

After oven-drying at 50°–60° C. under vacuum, 113 g of intermediate (VII):

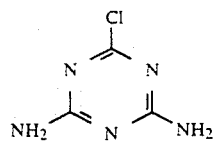

are obtained as a white, crystalline, nonmelting powder, containing 24.12% of chlorine (theoretical value =24.36%).

The structure of this compound was further confirmed by an I.R. spectroscopic analysis.

72.8 g of intermediate (VII), 350 g of water and then, with stirring, 74 g of N,N-bis (methoxyethyl) amine are charged to a reactor of 1 liter of capacity, equipped with a stirrer, a thermometer, a charging funnel, a reflux condenser and a heating bath.

The reaction mixture is heated to its boiling temperature, and is kept 4 hours under reflux conditions.

The reaction mixture is then kept under reflux conditions for a further 8 hours, with 20 g of sodium hydroxide in 50 g of water being portionwise added so as to keep the pH value of the reaction mixture comprised within the range of from 7 to 8.

The reaction mixture is cooled to room temperature, and the formed product is filtered off and then it is washed with water on the filter.

After drying the filter cake in a vacuum oven at 60° C., 90 g of the product:

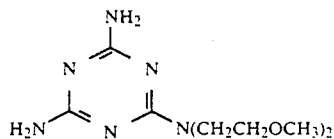

are obtained as a white crystalline powder having a melting point (m.p.) of 124°–128° C.

EXAMPLE 2

91 g of intermediate (VII), 240 cm$^3$ of toluene and 119.6 of morpholine are charged to the same equipment as disclosed in Example 1.

The reaction mixture is heated at 65°–70° C. and is kept at this temperature for 2 hours; the temperature is then increased up to boiling temperature, and the reaction mixture is let reflux for 1 hour.

The reaction mixture is permitted to cool down to room temperature; then the product formed is filtered off. The filter cake is washed with plentiful water and after drying 92 g of the product:

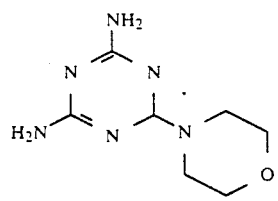

is obtained as a white crystalline powder having m.p. =248–250° C.

EXAMPLE 3

184.5 g of cyanuric chloride and 1300 cm³ of methylene chloride are charged to the same reaction equipment as of Example 1, but initially equipped with a cooling bath.

With the reaction mixture being cooled from the outside, 87.2 g of morpholine and 40 g of sodium hydroxide dissolved in 150 cm³ of water are simultaneously added to the reaction mixture, within a 3 hours time, with the pH value of said reaction mixture being kept comprised within the range of from 5 to 7, and the temperature being kept comprised within the range of from 0° to 3° C.

The temperature is kept comprised within the above-said range of from 0° to 3° C. for a further 3 hours, then the aqueous phase is separated.

By distilling off methylene chloride, 230 g of intermediate (VIII):

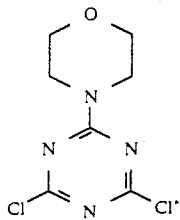
(VIII)

are obtained as a white crystalline powder having m.p. =155°-157° C. and a purity of greater than 98%, as deter chromatography. The chlorine content is 29.87% (theoretical value: 30.21%).

100 g of a solution of ammonium hydroxide at 30% by weight, 100 cm³ of water, and 70.5 g of intermediate (VIII) are charged to a reactor of 0.5 liters of capacity, equipped in the same way as of Example 1.

The reaction mixture is heated up to 50° C. and is kept 7 hours at this temperature. Said reaction mixture is subsequently permitted to cool to room temperature. The product obtained is filtered off and the filter cake is washed with water.

By drying the filter cake, 58 g of intermediate product (IX):

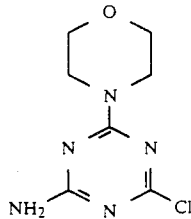
(IX)

obtained as a white crystalline powder having m.p. =189°-191° C. and a chlorine content of 16.28% (theoretical value 16.47%).

The structure of compounds (VIII) and (IX) is confirmed through infrared spectroscopic analysis.

58 g of intermediate (IX) and 300 g of water and then, with stirring, 18 g of 2-amino ethanol are charged to the above disclosed reaction equipment. The reaction mixture is heated to its boiling temperature and is maintained under reflux conditions for 3 hours. Then, with said reaction mixture being kept refluxing for a further 3 hours, 11.8 g of sodium hydroxide in 50 g of water are portionwise added, so as to keep the pH value comprised within the range of from 7 to 8. The reaction mass is cooled, the obtained product is filtered off and the filter cake is washed with water.

After drying, 58 g of the product:

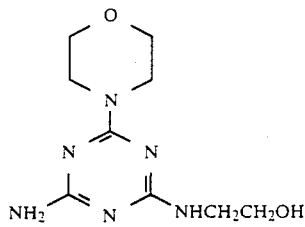

are obtained as a white crystalline powder having m.p. =159°-161° C.

EXAMPLE 4

184.5 g of cyanuric chloride and 800 cm³ of methylene chloride are charged to a reactor of 2 liters of capacity, equipped in the same way as of the preceding Examples.

With the reaction mixture being kept cooled from the outside, 174 g of morpholine dissolved in 150 g of water are added within a 2 hours time to the reaction mixture, kept at a temperature comprised within the range of from 4° to 5° C.

The temperature is permitted to rise to 10° C., and, with said temperature being kept comprised within the range of from 10° to 20° C., a solution constituted by 80 g of sodium hydroxide in 200 g of water is added within 4 hours.

The reaction mass is kept at the temperature of 20° C. for a further 2 hours, and the aqueous phase is then separated.

By distillation of methylene chloride, 270 g of intermediate (X):

(X)

are obtained as a white crystalline powder having m.p. =172°-174° C. and a chlorine content of 12.26% (theoretical value: 12.43%).

57 g of intermediate (X), 600 g of water and, with stirring, 23 g of N,N-dihydroxyethylamine are charged to the same reaction equipment as disclosed above.

The reaction mixture is heated to its boiling temperature and is kept under reflux conditions for 2 hours, then 8 g of sodium hydroxide dissolved in 80 g of water are added. After said addition, the reaction mixture is kept refluxing for a further 4 hours.

The reaction mass is cooled down to room temperature, then is filtered and the filter cake is washed with water.

By drying the filter cake, 65 g of product:

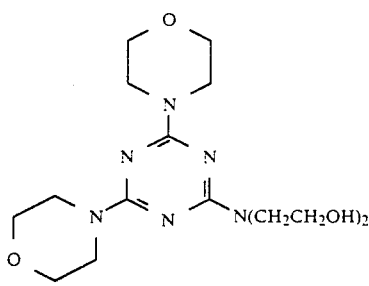

are obtained as a white crystalline powder having m.p. =179°-181° C.

EXAMPLE 5

129 g of cyanuric chloride, 400 cm of acetone and 500 g of ice are charged to the same reaction equipment as of Example 4.

With the temperature of the reaction mixture being kept comprised within the range of from 3° to 5° C., 105 g of 2-methylaminoethanol are added within about 2 hours, reaction mixture is kept stirred at 5° C. for 1 hour. With the reaction mixture being still kept at the temperature of 5° C., 118 g of sodium bicarbonate are added within a 30 minutes time. The reaction mixture is kept stirred at 5° C. for a further 30 minutes, then its temperature is increased up to 35°-40° C., and is maintained at this value for 3 hours.

Then 67 g of morpholine are added, and after installing the suitable distillation tower, the reaction mixture is further heated, so as to cause acetone contained in the reaction mass to distill off. Such an operation requires a total time of about 2 hours.

When the internal temperature reaches the value of 100° C., a solution constituted by 28 g of sodium hydroxide in 50 g of water is added within a 2 hours time.

The reaction mixture is maintained under reflux conditions for a further 2 hours, then is permitted to cool down to room temperature.

The obtained product is filtered off, is washed with water and is dried.

200 g of product:

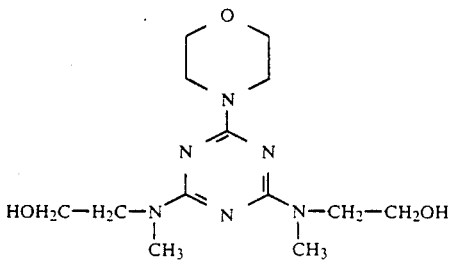

are obtained as a white crystalline powder having m.p. =91°-92° C.

EXAMPLE 6

28.8 g of tert-butylamine, 600 g of water and 20.3 g of sodium carbonate are charged to the same reaction equipment as of Example 1.

The reaction mixture is heated to 85° C. and then 80.9 g of intermediate (IX) is portionwise added to it, within a time of about 30 minutes.

The reaction mixture is heated to boiling temperature and is maintained under reflux conditions for 5 hours.

The reaction mixture is permitted to cool down to room temperature; then the obtained product is filtered off and the filter cake is washed with water.

After drying, 75.5 g of product:

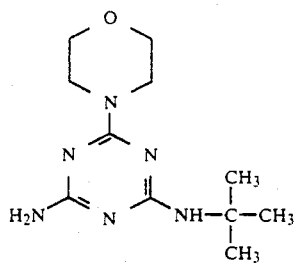

are obtained as a white crystalline powder with m.p. =145°-151° C.

EXAMPLE 7

129 g of cyanuric chloride and 1000 cm$^3$ of methylene chloride are charged to a reactor of 2 liters of capacity, equipped in the same way as of the preceding tests.

With the solution being kept at a temperature comprised within the range of from 0° to 2° C. by external cooling, 40 g of 3-amino-1-propene dissolved in 150 g of water are added within a 90 minutes time.

With the temperature being maintained within the range of from 0° to 2° C., 28 g of sodium hydroxide dissolved in 100 g of water are added within a time of about 2 hours. The reaction mixture is then kept stirred at the temperature of 3°-5° C. for a further 2 hours, then the water phase is separated.

By distilling off methylene chloride, 137 g of intermediate (XI):

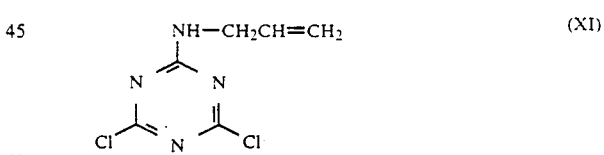

is obtained as a white crystalline powder having m.p. =70°-72° C. and a chlorine content of 34.52% (theoretical value: 34.63%).

200 g of a solution of ammonium hydroxide at 30% by weight and 500 g of water are charged to the same reaction equipment as above disclosed. The mass is heated to 40° C., then 123 g of intermediate (XI) are added over a 30 minutes time, with the temperature being still kept at 40° C.

The temperature is increased to 45° C., and is maintained at value for about 6 hours.

At the end, the reaction mixture is cooled to room and the obtained product is filtered off. The filter cake is washed with water and is dried.

104 g of intermediate (XII):

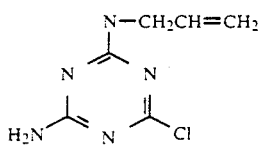

(XII)

are obtained as a white crystalline powder having m.p. = 168°-170° C. and a chlorine content of 19.03% (theoretical value: 19.14%).

The structure of compounds (XI) and (XII) is confirmed through NMR analysis.

300 g of water and 55.7 g of intermediate (XII) and then, with stirring, 26.2 g of morpholine are charged to a reactor of 0.5 liters of capacity, equipped in the same way as disclosed above.

The reaction mixture is heated to boiling temperature and is kept about 3 hours under reflux conditions. With the temperature being still kept at the same value, 12 g of sodium hydroxide dissolved in 50 g of water are subsequently added over a 3 hours time, such as to keep the pH value of the reaction mixture comprised within the range of from 7 to 8.

The reaction mass is cooled to room temperature; the obtained product is filtered off. The filter cake is washed with water on the same filter.

After drying, 64 g of product:

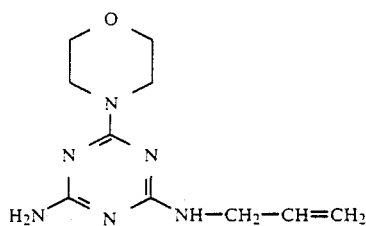

are obtained as a white crystalline powder having m.p. = 146°-148° C.

EXAMPLES 8-26

By operating under conditions analogous to those as disclosed in Examples from 1 to 7, the compounds of general formula (I) are prepared, which are reported in Table 1.

TABLE 1

| Ex. No. | R—N—R$_1$ | | R$_2$N—R$_3$ | | R$_4$—N—R$_5$ | | Melting Point (°C.) |
|---|---|---|---|---|---|---|---|
| 8 | CH$_2$CH$_2$OH | H | H | H | H | H | 225–230 |
| 9 | CH$_2$CH$_2$OCH$_3$ | H | H | H | H | H | 166–269 |
| 10 | CH$_2$CH$_2$OHCH$_2$CH$_2$OH | | H | H | H | H | 198–202 |
| 11 | N⟨⟩NH | | H | H | H | H | 262–266 |
| 12 | N⟨⟩N—CH$_3$ | | H | H | H | H | 206–208 |
| 13 | N⟨piperidine⟩ | | H | H | H | H | 215–217 |
| 14 | CH$_2$CH$_2$OH | cyclohexyl | H | H | H | H | 105–108 |
| 15 | H | (CH$_2$)$_5$OH | H | H | H | H | 143–147 |
| 16 | N⟨⟩O | | CH$_2$CH$_2$OCH$_3$ | H | H | H | 95–97 |
| 17 | N⟨⟩O | | N⟨⟩O | | H | H | 168–170 |
| 18 | H | CH$_2$CH$_2$OH | CH$_2$CH$_2$OH | H | H | H | 160–165 |
| 19 | N⟨⟩O | | N⟨⟩O | | CH$_2$CH$_2$OH | CH$_3$ | 147–149 |

TABLE 1-continued

| Ex. No. | R—N—R$_1$ | | R$_2$N—R$_3$ | | R$_4$—N—R$_5$ | | Melting Point (°C.) |
|---|---|---|---|---|---|---|---|
| 20 | \_N\_O\_ (morpholine) | | \_N\_O\_ (morpholine) | | CH$_2$CH$_2$OCH$_3$ | H | 120–122 |
| 21 | H | (CH$_2$)$_3$N(C$_2$H$_5$)$_2$ | H | H | H | H | 130–132 |
| 22 | H | CH$_2$CH$_2$OH | CH$_2$CH$_3$OH | H | CH$_2$CH$_2$OH | H | 98–100 |
| 23 | CH$_3$ | (CH$_2$)$_2$OCH=CH$_2$ | H | H | H | H | 136–138 |
| 24 | H | (CH$_3$)$_2$O(CH$_2$)$_2$OH | (CH$_2$)$_2$O(CH$_2$)$_2$OH | H | H | H | 121–123 |
| 25 | \_N\_S\_ | | H | H | H | H | 237–239 |
| 26 | \_N\_O\_ (morpholine) | | t-C$_8$H$_{17}$ | | H | H | 123–125 |

TABLES 2 and 3

The tests reported in said tables relate to polymeric compositions containing the products of general formula (I) prepared according to the preceding examples.

Specimens having the shape of small slabs of about 3 mm of thickness were prepared by molding mixtures of granular polymer and additives of a MOORE platen press, with a molding cycle of 7 minutes and a molding pressure of about 40 kg/cm$^2$.

On the so obtained slab specimens the level of self-extinguishment was determined by measuring the oxygen index (L.O.I. according to ASTM D-2863 77) in a Stanton Redcroft instrument, and applying the "Vertical Burning Test" which makes it possible for the material to be classified according to three rating levels 94 V-0, 94 V-1, and 94 V-2 according to UL 94 standards (issued by Underwriters Laboratories—U.S.A.).

In Table 2 the values are reported, which were obtained by using an isotactic polypropylene in flakes form having a melt flow index of 12, and an insoluble fraction in boiling n-heptane of 96% by weight.

In Table 3 the values are reported, which were obtained by using low-density polyethylene in granular form with a melt flow index of 7; polystyrene granules containing 5% by weight of butadiene rubber and having a melt flow index of 9; thermoplastic polyurethane granules, either of polyester grade (ESTANE 54600 ®) by Goodrich) or of polyether grade (ESTANE 58300 ®) by Goodrich), having respective specific gravities of 1.19 and 1.10 g cm$^3$; and ethylene-propylene elastomeric copolymer containing 45% by weight of propylene; an acrylonitrile-butadiene-styrene terpolymer having a specific gravity 1.06 g cm$^3$, a melt flow index of 1.6, and containing about 40% of acrylonitrile and styrene, and 20% of butadiene.

TABLE 2

| Example No. | Product from Example No. | Parts by weight | | | | LOI ASTM D 2863 | UL94 3 mm |
|---|---|---|---|---|---|---|---|
| | | Product | PP | AO (1) | APP (2) | | |
| 27 | 1 | 10 | 74 | 1 | 15 | 31.4 | V0 |
| 28 | 2 | 12.5 | 74 | 1 | 12.5 | 33.8 | V0 |
| 29 | 3 | 7.1 | 74 | 1 | 17.9 | 35.2 | V0 |
| 30 | 4 | 9.3 | 71 | 1 | 18.7 | 32.7 | V1 |
| 31 | 5 | 9 | 72 | 1 | 18 | 32.6 | V0 |
| 32 | 6 | 8.3 | 74 | 1 | 16.7 | 31.4 | V0 |
| 33 | 7 | 9 | 72 | 1 | 18 | 33.8 | V0 |
| 34 | 8 | 7.1 | 74 | 1 | 17.9 | 32.8 | V0 |
| 35 | 9 | 9.3 | 71 | 1 | 18.7 | 33.9 | V0 |
| 36 | 10 | 7.2 | 71 | 1 | 20.8 | 34.6 | V0 |
| 37 | 11 | 12 | 75 | 1 | 12 | 32.3 | V0 |
| 38 | 12 | 8.3 | 74 | 1 | 16.7 | 32.8 | V0 |
| 39 | 13 | 9.3 | 71 | 1 | 18.7 | 32.5 | V1 |
| 40 | 14 | 8.3 | 74 | 1 | 16.7 | 30.8 | V0 |
| 41 | 15 | 9.3 | 70 | 1 | 19.7 | 33.7 | V0 |
| 42 | 16 | 9.3 | 71 | 1 | 18.7 | 34.3 | V1 |
| 43 | 17 | 10 | 74 | 1 | 15 | 33 | V2 |
| 44 | 18 | 7.1 | 74 | 1 | 17.9 | 34.9 | V0 |
| 45 | 19 | 9.3 | 71 | 1 | 18.7 | 33.6 | V1 |
| 46 | 20 | 8.3 | 74 | 1 | 16.7 | 31.5 | V2 |
| 47 | 21 | 8.3 | 74 | 1 | 16.7 | 31.2 | V0 |
| 48 | 22 | 8.3 | 74 | 1 | 16.7 | 33.2 | V0 |
| 49 | 23 | 8.3 | 74 | 1 | 16.7 | 30.2 | V0 |
| 50 | 24 | 9.3 | 68 | 1 | 18.7 | 32.6 | V0 |
| 51 | 25 | 12.5 | 74 | 1 | 12.5 | 34.2 | V0 |
| 52 | 26 | 8.3 | 74 | 1 | 16.7 | 32.3 | V0 |
| 53 | 1 | 8.3 | 74 | 1 | 16(3) | 32.6 | V0 |
| 54 | 2 | 8 | 75 | 1 | 16.7 (4) | 30.9 | V0 |
| 55 | 25 | 10 | 74 | 1 | 15(5) | 32.0 | V0 |
| 56 | 1 | 12 | 75 | 1 | 12(*) | 33.6 | V0 |
| 57 | 2 | 8.3 | 74 | 1 | 16.7 (*) | 34.1 | V0 |

(1) AO = antioxidant; a mixture consisting of 2 parts of dilauryl-thiopropionate and 1 part of pentaerythriol tetra [3-(3,5-ditert-butyl-4-hydroxyphenyl)propionate]
(2) APP = ammonium polyphosphate · Exolit 422 ® (Hoechst)
(3) monoammonium salt from ethane-1-amino-1,1-diphosphonic acid
(4) bisammonium salt from ethane-1-amino-1,1-diphosphonic acid
(5) monoammonium salt from ethane-1-hydroxy-1,1-diphosphonic acid
(*) APP = ammonium phosphate microencapsulated with melamine-formaldehyde resin Exolit 462 ® (Hoechst)

TABLE 3

| Example No. | Polymeric support | Product from Example No. | Polymer | Product | AO (1) | APP (2) | L.O.I. (ASTM D2863) | UL 94 3 mm |
|---|---|---|---|---|---|---|---|---|
| 58 | LDPE (2) | 1 | 69 | 10 | 1 | 20 | 28.6 | V1 |
| 59 | LDPE (2) | 11 | 69 | 10 | 1 | 20 | 28.2 | V0 |

TABLE 3-continued

| Example No. | Polymeric support | Product from Example No. | Polymer | Product | AO (1) | APP (2) | L.O.I. (ASTM D2863) | UL 94 3 mm |
|---|---|---|---|---|---|---|---|---|
| 60 | LDPE (2) | 3 | 63 | 9 | 1 | 27 | 37.8 | V0 |
| 61 | LDPE (2) | 24 | 69 | 7.5 | 1 | 22.5 | 28.5 | V0 |
| 62 | LDPE (2) | 25 | 63 | 9 | 1 | 27 | 39.1 | V0 |
| 63 | HIPS (2) | 1 | 64 | 11.7 | 1 | 23.3 | 27.6 | V1 |
| 64 | HIPS (2) | 2 | 62 | 9.2 | 1 | 27.8 | 32.9 | V1 |
| 65 | HIPS (2) | 3 | 64 | 10 | 1 | 25 | 31.8 | V0 |
| 66 | HIPS (2) | 12 | 64 | 11.7 | 1 | 23.3 | 30.8 | V0 |
| 67 | HIPS (2) | 24 | 64 | 11.7 | 1 | 23.3 | 30.5 | V1 |
| 68 | Ether PU (2) | 2 | 69 | 8.6 | 1 | 21.4 | 25.7 | V0 |
| 69 | Ester PU (2) | 25 | 69 | 8.6 | 1 | 21.4 | 36 | V0 |
| 70 | Ester PU | 3 | 69 | 8.6 | 1 | 21.4 | 34.6 | V0 |
| 71 | PP/PE (2) | 25 | 64 | 8.7 | 1 | 26.3 | 38.9 | V0 |
| 72 | ABS (2) | 3 | 60 | 10 | 1 | 29 | 27.5 | V0 |

Footnotes to Table 3
(1) AO = antioxidant: a mixture consisting of 2 parts of dilauryl thiopropionate and 1 part of pentaerythritol tetra-[3-(3,5-di-tert-butyl-4-hydroxyphenyl)propionate]
(2) APP = ammonium polyphosphate Exolit ® (Hoechst)
LDPE = Low-density polyethylene
HIPS = Polystyrene containing 5% of butadiene rubber
(Ether)PU = Polyether-polyurethane
(Ester)PU = Polyester-polyurethane
PP/PE = Propylene-ethylene copolymer
ABS = Acrylonitrile/butadiene/styrene terpolymer.

EXAMPLE NO. 73

Comparative Example

By operating according to the same modalities as of Examples from No. 27 to No. 57, but with 2,4,6-triamino1,3,5-triazine being used as the nitrogen-containing compound [2,4,6-triamino-1,3,5-triazine corresponds to the compound of general formula (I), wherein all constituents from R to $R_5$ are hydrogen], the hereinunder specified composition is prepared:

Polypropylene 74 parts by weight
Antioxidant 1 part by weight
Ammonium polyphosphate 16.7 parts by weight
2,4,6-triamino-1,3,5-triazine : 9 parts by weight By using the abovesaid composition, specimens were prepared and were tested for their self-extinguishing properties, according to the same modalities as disclosed above.

The following results were obtained:
L.O.I. 25.2
UL 94 (3mm) Class B (the specimen burns).

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Self-extinguishing polymeric compositions comprising:
   (a) from 89 to 45 parts by weight of a thermoplastic polymer, or of a polymer endowed with elastomeric properties;
   (b) from 8 to 30 parts by weight of one or more ammonium or amine phosphate(s), and/or phosphonate(s);
   (c) from 3 to 25 parts by weight of one or more compound(s) having the formula (I):

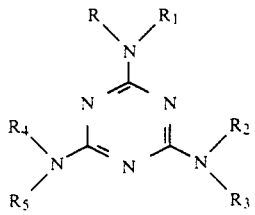

(I)

wherein: at least one of the radicals from R to $R_5$ is:

$[C_nH_{2n}]\!\!-\!\!O\!-\!R_6$;

or

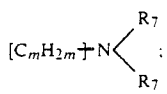

wherein:
n = an integer within the range of from 2 to 8;
m = an integer within the range of from 2 to 6;
$R_6$ = H; $(C_1-C_8)$-alkyl; $(C_2-C_6)$-alkenyl; $[C_pH_{2p}-]-O-R_8$, wherein p is an integer within the range of from 1 to 4, and $R_8$ is either H or a $(C_1-C_4)$-alkyl; $(C_6-C_{12})$-cycloalkyl or $(C_6-C_{12})$-alkylcycloalkyl; the radicals $R_7$, which can be either equal to, or different from one another, are: H; $(C_1-C_8)$-alkyl; $(C_2-C_6)$-alkenyl; $(C_6-C_{12})$-cycloalkyl; $(C_6-C_{12})$-alkylcycloalkyl; $(C_1-C_4)$-hydroxyalkyl; or the moiety:

is replaced by a heterocyclic radical linked to the alkyl chain through the nitrogen atom and possibly containing another heteroatom; or in formula (I) at least one of the moieties

is replaced by a heterocyclic radical selected from the group consisting of pyrrolidine; piperidine morpholine; thiomorpholine; piperazine; 4-methyl piperazine; 4-ethylpiperazine; 2-methyl piperazine; 2,5-dimethyl piperazine; 2,3,5,6-tetramethyl piperazine; 2,2,5,5-tetramethyl piperazine; 2-ethyl piperazine; 2,5-diethyl piperazine.

2. Self-extinguishing polymeric compositions according to claim 1, wherein at least one of the radicals from R to $R_5$ in formula (I) is replaced by $-[C_nH_{2n}]-O-R_6$ wherein:

n is an integer within the range of from 2 to 4 and $R_6$ is $(C_1-C_4)$-alkyl.

3. Self-extinguishing polymeric compositions according to claim 1, wherein one or two of the following moieties:

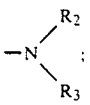

in the compound of formula (I) is (are):

groups.

4. Self-extinguishing polymeric compositions according to claim 1, wherein the moiety:

in formula (I) is replaced by a heterocyclic radical selected from among: aziridine; pyrrolidine; piperidine; morpholine; thiomorpholine; piperazine; 4-methyl piperazine; 4-ethylpiperazone.

5. Self-extinguishing polymeric compositions according to claim 1, wherein the ammonium phosphate(s) as mentioned under (b) has the formula $(NH_4)_{n+2}P_nO_{3n+1}$ wherein n is an integer equal to, or greater than, 2.

6. Self-extinguishing polymeric compositions according to claim 1, wherein the ammonium phosphate(s) as mentioned under (b) has the formula $(NH_4PO_3)_n$ wherein n is a numeral within the range of from 50 to 500.

7. Self-extinguishing polymeric compositions according to claim 1, wherein the amine phosphate(s) as mentioned under (b) is(are) selected from among diethylammonium or diethylamine phosphate; ethylenediamine phosphate; melamine ortho or pyrophosphate.

8. Self-extinguishing polymeric compositions according to claim 1, wherein the mono or polyammonium phosphonate(s) as mentioned under (b) is(are) selected from among the salts derived from mono or polyphosphonic acids.

9. Self-extinguishing polymeric compositions according to claim 1, wherein the (a) polymer is selected from among polymers and copolymers of olefins of formula $R-CH=CH_2$ wherein R is a hydrogen atom or a $(C_1-C_8)$-alkyl or -aryl radical; acrylonitrile-/butadiene/styrene terpolymers styrene/acrylonitrile copolymers; polyurethane; poly(ethylene terephthalate); poly(butylene terephthalate); polyamides.

10. Self-extinguishing polymeric compositions according to claim 10, wherein the olefinic polymers and copolymers are selected from among the group comprising:

(1) either isotactic or prevailingly isotactic polypropylene;
(2) HDPE, LLDPE, LDPE polyethylene;
(3) crystalline copolymers of propylene with minor proportions of ethylene and/or other alphaolefins, such as, e.g., 1-butene, 1-hexene, 1-octene, 4-methyl-1-pentene;
(4) heterophasic compositions comprising (A) a fraction constituted by a propylene homopolymer or one of the copolymers as specified under above item (3); and (B) a copolymeric fraction constituted by elastomeric copolymers of ethylene- with an alpha-olefin, optionally containing minor proportions of a diene;
(5) elastomeric copolymers of ethylene with alphaolefins optionally containing minor proportions of a diene.

11. Molded articles obtained from the compositions according to claim 1.

12. Self-extinguishing polymeric compositions according to claim 10, wherein the alpha-olefin is selected from propylene and 1-butene.

13. Self-extinguishing polymeric compositions according to claim 3 wherein the hereto atom is selected from the group consisting of O, S and N.